United States Patent [19]

McMaster et al.

[11] Patent Number: 5,125,608
[45] Date of Patent: Jun. 30, 1992

[54] PHOTOVOLTAIC PANEL SUPPORT ASSEMBLY

[75] Inventors: Harold A. McMaster, Perrysburg; Robert D. Nicholson, Pemberville; Steven A. F. Kaake, Toledo, all of Ohio

[73] Assignee: 700 Solar Club, Inc., Perrysburg, Ohio

[21] Appl. No.: 649,310

[22] Filed: Jan. 30, 1991

Related U.S. Application Data

[63] Continuation of Ser. No. 343,052, Apr. 25, 1989, abandoned.

[51] Int. Cl.⁵ ............................................. F16M 11/00
[52] U.S. Cl. .................................... 248/163.1; 52/90; 126/450; 136/244; 248/125; 248/161; 248/176; 248/676
[58] Field of Search ............ 248/163.1, 637, 676, 248/466, 469, 121, 161, 411, 165, 179, 176, 125; 126/450; 52/90, 92; 136/244, 246, 291

[56] References Cited

U.S. PATENT DOCUMENTS

| | | | |
|---|---|---|---|
| 2,971,736 | 2/1961 | Enneper | 248/163.1 |
| 4,226,256 | 10/1980 | Hawley | 136/244 |
| 4,245,895 | 1/1981 | Wildenrotter | 136/244 |
| 4,265,422 | 5/1981 | Van Leeuwen | |
| 4,269,173 | 5/1981 | Krueger | 126/450 |
| 4,309,857 | 1/1982 | Lovering | 52/90 |
| 4,371,139 | 2/1983 | Clark | 136/244 |
| 4,421,943 | 12/1983 | Withjack | 136/244 |

FOREIGN PATENT DOCUMENTS

| | | | |
|---|---|---|---|
| 73478 | 6/1981 | Japan | 136/244 |
| 64980 | 4/1982 | Japan | 136/244 |
| 13083 | 1/1987 | Japan | 136/244 |
| 208676 | 9/1987 | Japan | 136/244 |

OTHER PUBLICATIONS

Grassi, C., "Array Structures for Fixed Flat-Plate Photovoltaic Power Generators", Proceedings of 4th European Community Photovoltaic Solar Energy Conference, May 10–14, 1982, pp. 248–255.

Primary Examiner—Ramon O. Ramirez
Attorney, Agent, or Firm—Brooks & Kushman

[57] ABSTRACT

Provided is a support assembly for mounting an array of photovoltaic panels to a support surface such as the ground. According to the invention, there is provided a plurality of front and rear support posts, each post having an anchor portion to be driven into the support surface and a leg portion which is nested therein and longitudinally adjustable to raise or lower corresponding front and rear horizontal supports. Photovoltaic panels are mounted lengthwise across the horizontal supports in a predetermined position to minimize the stress thereon caused by wind load. The horizontal supports further comprise wiring raceways to support wiring harnesses originating from the photovoltaic panels and terminating at the end of each row of photovoltaic panels in the array.

48 Claims, 4 Drawing Sheets

5,125,608

PHOTOVOLTAIC PANEL SUPPORT ASSEMBLY

This is a continuation of copending application(s) Ser. No. 07/343,052 filed on Apr. 25, 1989, now abandoned.

TECHNICAL FIELD

The present invention relates to a solar energy collection system and more particularly to a photovoltaic panel support assembly.

BACKGROUND OF THE INVENTION

Since the discovery by the University of Dundee Group in the early 1970's, that high quality, low density of states amorphous silicon could be produced from the decomposition of silane (SiH4) gas in a glow discharge, amorphous silicon photovoltaic devices have emerged as a dominant force in the marketplace. These devices are much cheaper to manufacture in comparison to former crystalline devices. In turn, there has been renewed interest by industry in developing photovoltaic panel assemblies which can harness solar radiation and convert it directly to electricity. To this end, a variety of photovoltaic panel support pads and mounting racks have been developed for small scale applications. For example, U.S. Pat. No. 4,226,256 issued to Hauley discloses a solar panel assembly support pad for placement on the ground or other support surface. The support pad comprises a base plate, support means, upstanding longitudinal sides and flange means which is spaced apart and connected to the support means to define an interior section for receiving and holding a weighted material such as rocks.

Similarly, U.S. Pat. No. 4,421,943 issued to Withjack discloses an apparatus for delivering electrical energy from a mobile solar energy power source having solar energy collecting means which pivot into a storage base.

U S. Pat. No. 4,371,139 issued to Clark discloses an adjustable mounting rack for supporting photovoltaic panels on a support surface such as a roof. One end of the rack is adapted to provide predominant support of the collector, while the other end is height adjustable to present the collector at a predetermined tilt to the direction of the sun and to accept tension and/or compression due to wind loading.

U.S. Pat. No. 4,265,422 issued to Van Leeuwen discloses a single pole mounting solar panel assembly comprising at least one solar panel and upper and lower brackets fixed to the panel and to the pole. The brackets are provided with flange means for attachment to the pole.

For large scale applications, the concept of "solar fields" as they are termed in the art, is actively being researched. However, the high labor and material costs normally associated with these structures have hindered their full development and utilization. For example, a typical one mega-watt field might contain fifty-six rows of panels with one hundred ten or more support posts per row for a total of more than six thousand support posts. Each of the six thousand + posts must be individually mounted, oriented and leveled to specification to properly support the solar panels and maintain maximum efficiency of the solar field.

Typically, when mounting solar panels to the ground, support posts have been leveled by hand and thereafter secured by cement footings. Not surprisingly, this procedure requires a multitude of hours and material. Additional expenses are further required to employ highly skilled men and women knowledgeable in the assembly of photovoltaic panels.

These time and labor requirements have been generally accepted by the industry. However, if any one of these factors could be eliminated or reduced, the overall costs of installing photovoltaic panel support structures would be greatly reduced. As a result, the installation of solar fields would be economically feasible and, in turn, solar energy collection systems would be accepted as a true alternative to conventional energy generation systems.

SUMMARY OF THE INVENTION

It is an object of the present invention to provide a low cost, easy to install support assembly for mounting an array of photovoltaic panels.

In carrying out the above object, the support assembly of the present invention comprises a plurality of front and rear posts, each post having an anchor portion to be driven directly into the ground or attached to a plate or horizontal beam and a leg portion which is nested inside and fastened to the corresponding post anchor portion. The height of the posts may be telescopically varied by raising or lowering the corresponding leg portions.

As set forth above, the anchor portions of the support posts may be driven directly into the ground. The wind loading capability of the photovoltaic assembly is in accord with and exceeds conventional wind loading parameters for photovoltaic array fields are indicated in the publications Wind Loads on Flat Plate Photovoltaic Array Fields (non-steady winds), Department of Energy/Jet Propulsion Laboratory No. 954,833, Boeing Engineering and Construction Company, August 1981 (suggests that interior photovoltaic panels should withstand wind loading of 8.29 psf under 90 mph winds) and American Society of Civil Engineers Standard ASCE 7-88 (requires buildings and other structures to withstand wind loading of at least 10 psf). More particularly, the anchor portions of the support posts may be driven sufficiently into a ground mass to resist removal therefrom during wind loading of at least ninety (90) miles per hour which results in a pressure of about at least twenty-one (21) pounds per square foot on the photovoltaic panels. In most cases, no footings are needed. While it is contemplated that cement footings may be advantageous in certain instances when required by the terrain, the present invention generally obviates their need.

In accordance with the present invention, there is further provided front and rear horizontal supports which are affixed to the front and rear post leg portions respectively. The photovoltaic panels, in turn, are supported lengthwise by the horizontal supports. Additionally, each of the horizontal supports is designed to function as wiring raceways to support a wiring harness with connections to the photovoltaic panels.

As will be more fully illustrated below, the support assembly of the present invention may be installed quickly and easily without the need of highly skilled labor. As a result, the capital and labor costs normally required when installing a solar field are substantially reduced.

The objects, features, and advantages of the present invention are readily apparent from the following detailed description of the best mode for carrying out the invention when taken in connection with the accompanying drawings.

DESCRIPTION OF THE PREFERRED EMBODIMENT

Figure 1:
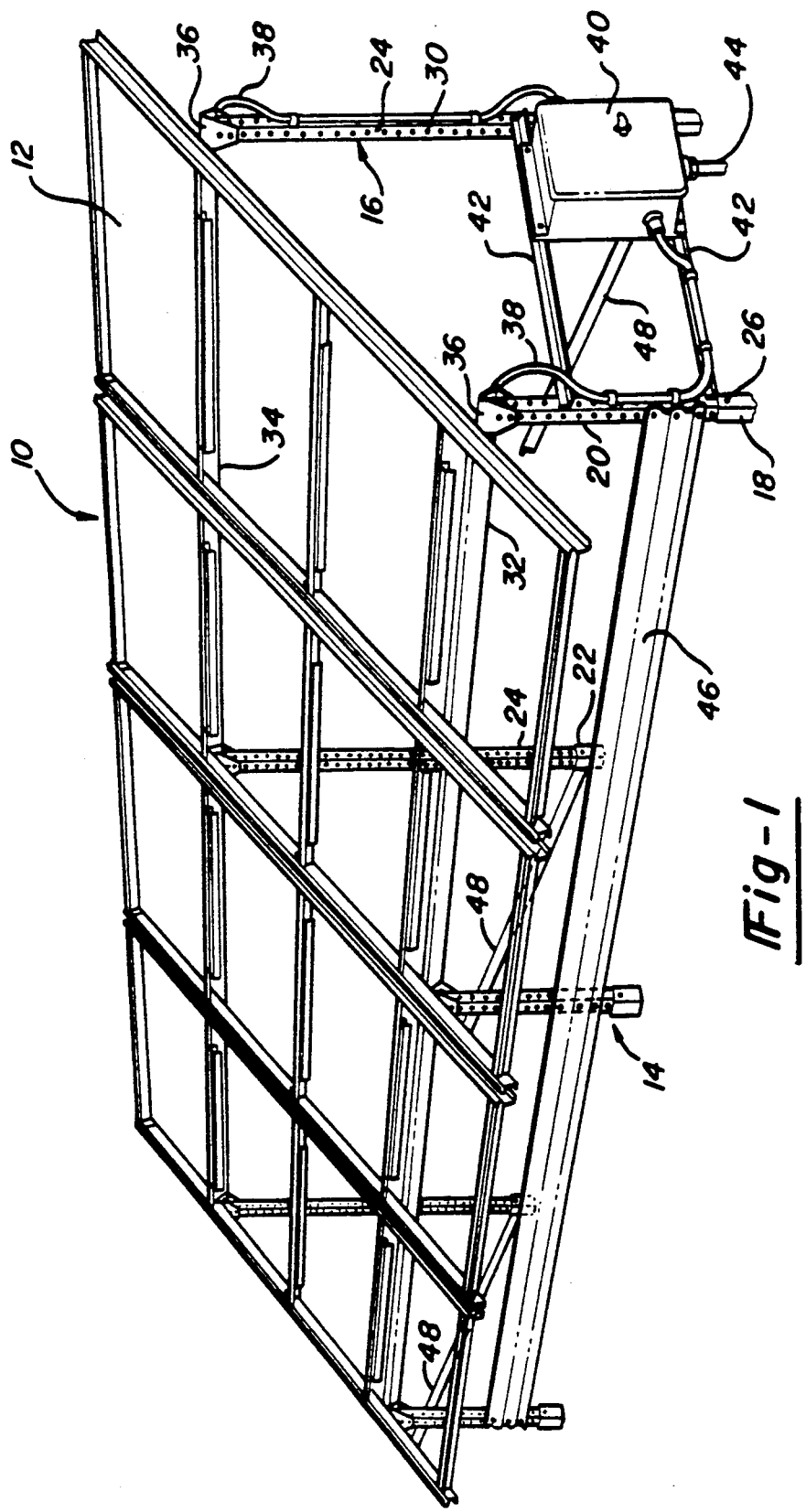
FIG. 1 is a perspective view illustrating the complete photovoltaic panel support assembly.

With reference to FIG. 1 of the drawings, a photovoltaic panel support assembly is indicated generally by reference numeral 10 and comprises an array of photovoltaic panels 12.

Figure 2:
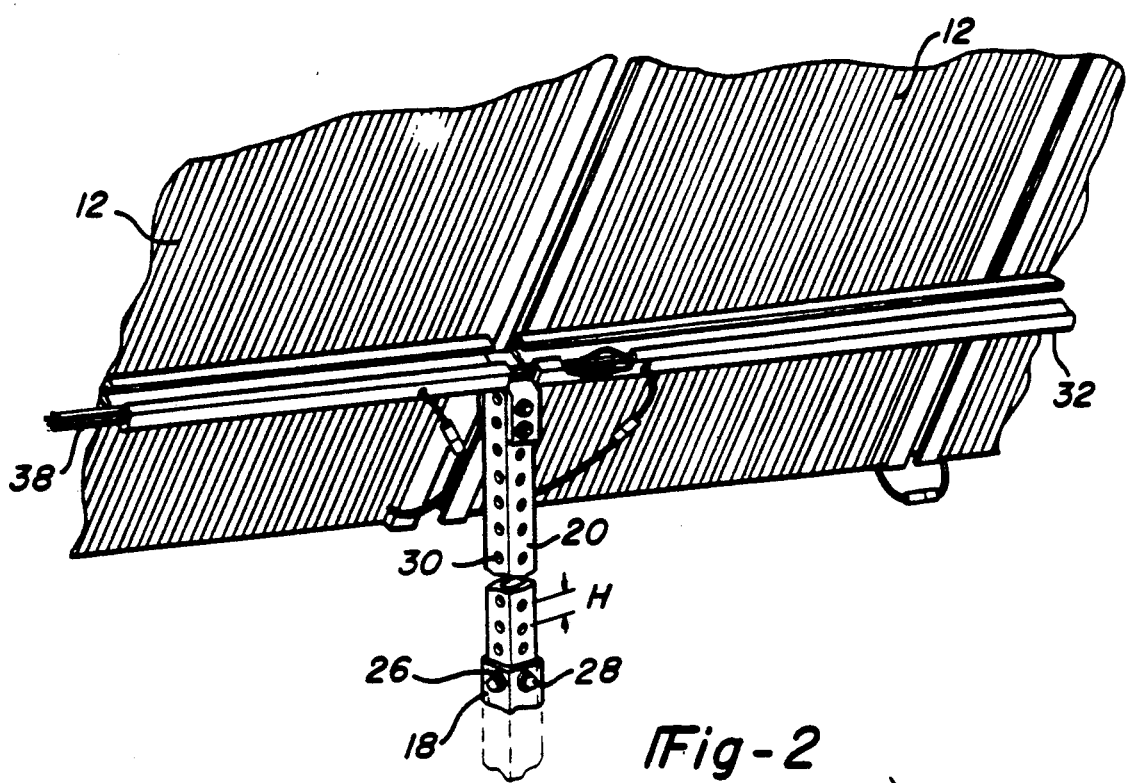
FIG. 2 a perspective view similar to FIG. 1 showing the rear of the photovoltaic panel support assembly.
Figure 3:
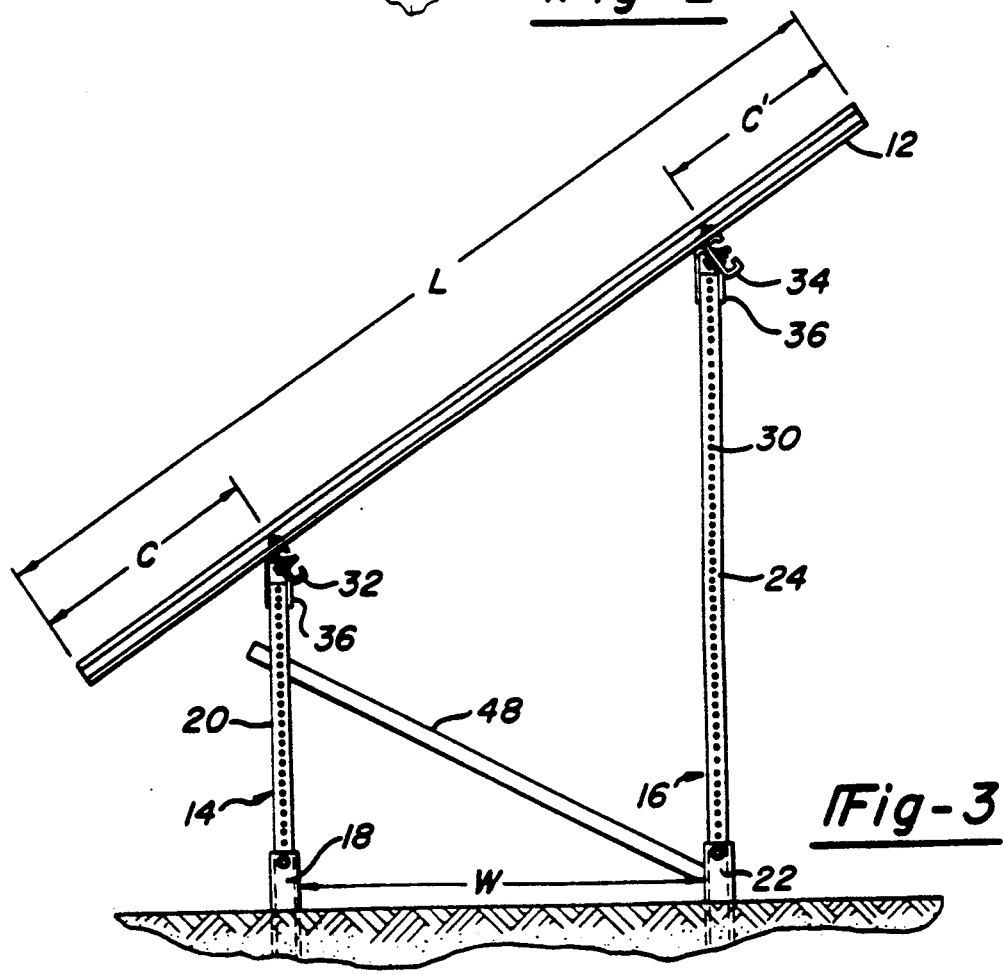
FIG. 3 is a side elevational view of the photovoltaic panel support assembly.

In carrying out the present invention, there is provided a plurality of vertical front and rear support posts 14 and 16, respectively, of the type disclosed and claimed by Herbert J. Henry in U.S. Pat. No. 3,628,296. As shown in FIGS. 1-3, each of the front posts 14 comprises a tubular anchor portion 18 and a tubular leg portion 20. Similarly, each of the rear posts 16 comprises a tubular anchor portion 22 and a tubular leg portion 24. Anchor portions 18 and 22 are designed to be driven into a ground mass or attached to a plate or horizontal beam 25.

Figure 7:
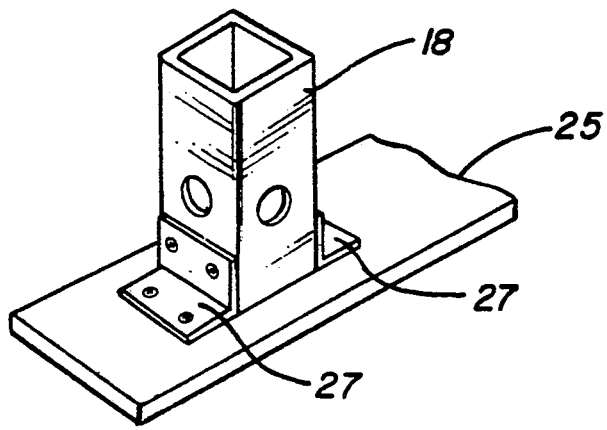
FIG. 7 is a perspective view of the front post anchor portion enlarged to show how it may be affixed to a plate or horizontal beam.

As shown in FIG. 7, it is contemplated that in the latter design, anchor portions 18 will be affixed to a first plate or horizontal beam 25 by means of brackets 27. Similarly, it is contemplated that anchor portions 22 will be affixed to a second plate or horizontal beam by means of similar brackets. Other variations are, of course, possible including affixing each pair of front and rear anchor portions to a corresponding plate or horizontal beam.

Figure 8:
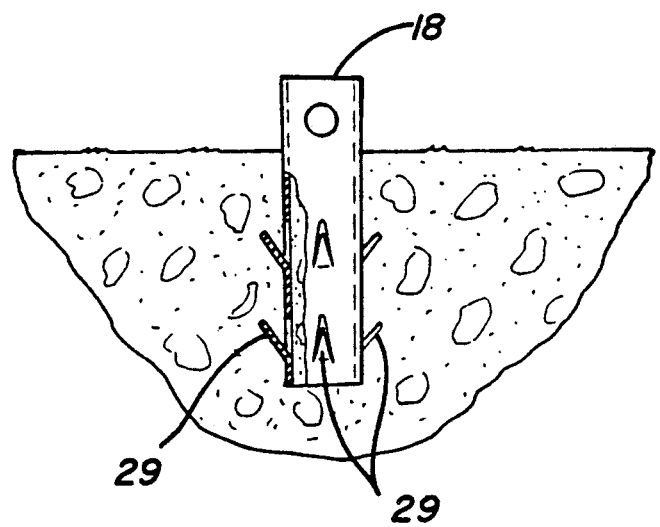
FIG. 8 is a side elevational view of a post anchor portion installed in a ground mass and enlarged to show the barbs extending therefrom.

Referring now to FIG. 8, it is appreciated that, in the former design, anchor portions 18 and 22 may also be provided with a plurality of barbs 29 which extend generally upwardly to contact the ground mass and increase the force required to extract the anchor portions.

Referring again to FIGS. 1-3, it is seen that leg portions 20 and 24 are designed to nest inside corresponding anchor portions 18 and 22 respectively and telescopically cooperate therewith. Anchor portions 18 and 22 are further provided with at least one aperture 26 for receiving a fastener 28. Additionally, leg portions 20 and 24 are provided with a plurality of apertures 30 axially spaced apart a predetermined distance H so that the height of each of the posts may be telescopically adjusted and fastened in position. As more fully set forth in FIG. 3, front posts 14 and rear posts 16 are arranged in pairs and vertically spaced apart from each other a predetermined distance W such that arctangent (H/W) is less than 5°.

Referring again to FIGS. 1 and 2, there is further provided a front horizontal support 32 affixed to each of the front posts leg portions 20 and a rear horizontal support 34 affixed to each of the rear posts leg portions 24.

Figure 4:
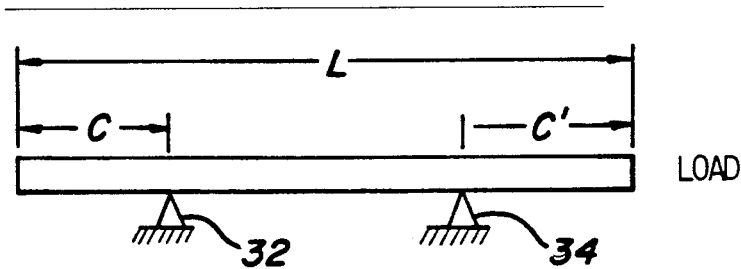
FIG. 4 is a schematic load diagram of the photovoltaic pane support assembly shown in FIGS. 1-3.

The photovoltaic panels 12 are affixed to front and rear horizontal supports 32 and 34. In turn, horizontal supports 32 and 34 are affixed to leg portions 20 and 24, respectively, by post brackets 36 as shown in FIGS. 1 and 3. The photovoltaic panels 12 have a length L and two ends which extend beyond supports 32 and 34 a distance approximately 0.2L to form a double overhanging beam affixed at two points. The load diagram of FIG. 4 schematically illustrates panel 12 affixed at two points front horizontal support 32 and rear horizontal support 34. The load shown uniformly distributed across a panel surface is representative of a wind load which would be typically exerted upon a panel surface. The length of the panel portion which extends beyond supports 32 and 34 is designated as C and C' respectively.

Figure 5:
FIG. 5 is a schematic shear diagram of the photovoltaic panel support assembly shown in FIGS. 1-3.
Figure 6:
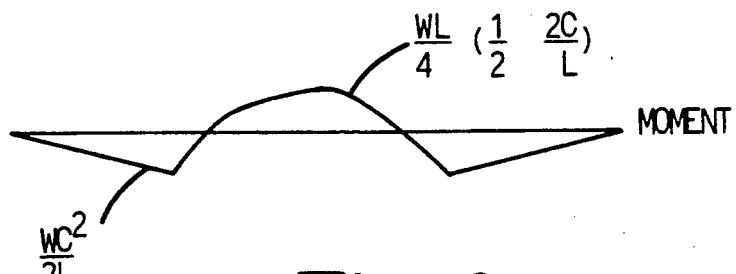
FIG. 6 is a schematic moment diagram of the photovoltaic panel support assembly shown in FIGS. 1-3.

The uniformly distributed load illustrated in FIG. 4 will also generate shear and moment loads on the panel as illustrated in FIGS. 5 and 6. In order to minimize the maximum load on the panel resulting from a uniformly distributed wind load or the like, the maximum positive moment should equal the maximum negative moment as illustrated in FIG. 6. The minimum peak bending moment will occur when C is approximately equal to 0.21L. Most preferably, the photovoltaic panel support assembly will be designed so that distances C and C' will be approximately 0.21L. It should be appreciated that the distance C can deviate somewhat from this ideal but preferably will be in the range of 0.16L to 0.26L. The moment and shear loads at any given point on the beam can be calculated using standard load equations found in Marks Standard Handbook for Mechanical Engineers 8th Edition, page 5-26 which is incorporated by reference herein.

In keeping with one of the principal objects of the invention, the front and rear horizontal supports 32 and 34 are designed to be attached to additional photovoltaic panel assemblies to form an array of photovoltaic panels. Horizontal supports 32 and 34 are further designed to function as a wiring raceway to support wiring harnesses 38 which originate from the photovoltaic panels 12 and connect the panels to an end row box 40 located at the end of each row of photovoltaic panels in the array. End row box 40 is affixed to side horizontal supports 42. Connected to end row box 40 is a quick disconnect burial cable 44. By way of reference, it is understood that the term "wiring" is used in its generic sense and is intended to include single and multiconductor cables and conductors of all types, whether insulated or uninsulated. It is further understood that the term "wiring raceway" is also used in its generic sense and is intended to include, by way of example, cable trays whether enclosed in whole or part.

Referring again to FIG. 1, attention is drawn to the wind breaking means in the form of a plurality of strips of corrugated sheet metal 46 which are horizontally affixed to the front posts 14. Strips 46 are designed to break the wind and reduce the stress on the structure caused by wind load. In outside rows and in certain environments, it may also be desirable to affix strips 46 to the sides of front and rear posts 14 and 16 and/or to horizontally affix strips 46 to rear posts 16. Diagonal braces 48 are further provided to reduce swaying of the structure and are affixed between front posts 14 and rear posts 16.

For safety, it is necessary to provide a ground means for the structure. It should be appreciated that front and rear support posts 14 and 16, in addition to supporting the front and rear horizontal supports 32 and 34, further act as electrical ground rods.

While the best modes for carrying out the invention have been described in detail, those familiar with the art to which this invention relates will recognize alternative designs and embodiments for practicing the invention as defined by the following claims.

What is claimed is:

1. A support assembly for mounting an array of photovoltaic panels, said assembly comprising:
    a plurality of front posts to support one portion of the array of panels, each of said front posts having an outer anchor portion configured to be driven sufficiently into a ground mass to resist removal therefrom during wind loading of about at least twenty-one (21) pounds per square foot on said array of photovoltaic panels, and an inner leg portion telescopically cooperating with said outer anchor portion;
    a plurality of rear posts, each of said rear posts having an outer anchor portion configured to be driven sufficiently into a ground mass to resist removal therefrom during wind loading of about at least twenty-one (21) pounds per square foot on said array of photovoltaic panels, and an inner leg portion telescopically cooperating with said outer anchor portion;
    a front horizontal support affixable to each of said front post leg portions; and
    a rear horizontal support affixable to each of said rear post leg portions, at least one of said front or rear horizontal supports having means for mounting the photovoltaic panels thereto.

2. A support assembly as in claim 1, wherein sid front and rear post anchor portions are tubular.

3. A support assembly as in claim 1, wherein said front and rear posts are substantially vertical.

4. A support assembly as in claim 1, further comprising a plurality of fasteners, wherein said front and rear post anchor portions are provided with an aperture for receiving said fasteners and said front and rear post leg portions are provided with a plurality of apertures axially spaced apart a distance H for receiving said fasteners so that the height of said front and rear posts may be varied.

5. A support assembly as in claim 4, wherein said front and rear posts are arranged in pairs vertically spaced apart from each other a distance W and said distance H and W are selected so that the arc tangent H/W is less than 5°.

6. A support assembly as in claim 1, further comprising a plurality of diagonal braces, each brace having a first end affixed to one of said front posts and a second end affixed to one of said rear posts.

7. A support assembly as in claim 1, further adapted to be connected to electrical wiring wherein at least one of said front or rear horizontal supports further defines a raceway sufficient to receive said electrical wiring.

8. A support assembly as in claim 7, wherein said raceway defined by said at least one of said front or rear horizontal supports is c-shaped.

9. A support assembly as in claim 1, wherein each of said front and rear posts have the characteristic of acting as electrical ground rods.

10. A support assembly as in claim 1, wherein at least one of said front and rear post anchor portions further comprises a plurality of barbs which extend in a direction opposite to the direction in which the anchor portion is driven whereby to resist the removal thereof from said ground mass.

11. A support assembly for mounting an array of photovoltaic panels adapted to be connected to electrical wiring, said assembly comprising:
    a plurality of front posts, each of said front posts having an outer anchor portion configured to be driven sufficiently into a ground mass to resist removal therefrom during wind loading of about at least twenty-one (21) pounds per square foot on said array of photovoltaic panels, and an inner leg portion telescopically cooperating with said outer anchor portion;
    a plurality of rear posts, each of said rear posts having an outer anchor portion configured to be driven sufficiently into a ground mass to resist removal therefrom during wind loading of about twenty-one (21) pounds per square foot on said array of photovoltaic panels and an inner leg portion telescopically cooperating with said outer anchor portion;
    a front horizontal support affixable to each of said front post leg portions; and
    a rear horizontal support affixable to each of said rear post leg portions, at least one of said front or rear horizontal supports having means for mounting the photovoltaic panels thereto and further defining a raceway sufficient to receive said electrical wiring.

12. A support assembly as in claim 11, wherein said front and rear post anchor portions are tubular.

13. A support assembly as in claim 11, wherein said front and rear post posts are substantially vertical.

14. A support assembly as in claim 11, further comprising a plurality of fasteners, wherein said front and rear post anchor portions are provided with an aperture for receiving said fasteners and said front and rear post leg portions are provided with a plurality of apertures axially spaced apart a distance H for receiving said fasteners so that the height of said front and rear posts may be varied.

15. A support assembly as in claim 14, wherein said front and rear posts are arranged in pairs vertically spaced apart from each other a distance W and said distances H and W are selected so that the arc tangent H/W is less than 5°.

16. A support assembly as in claim 14, further comprising a plurality of diagonal braces, each brace having a first end affixed to one of said front posts and a second end affixed to one of said rear posts.

17. A support assembly as in claim 11, wherein said raceway defined by said at least one of said front or rear horizontal supports is C-shaped.

18. A support assembly as in claim 11, wherein each of said front and rear posts have the characteristic of acting as electrical ground rods.

19. A support assembly as in claim 11, wherein at least one of said front and rear post anchor portions further comprises a plurality of barbs which extend in a direction opposite to the direction in which the anchor portion is driven whereby to resist the removal thereof from said ground mass.

20. A support assembly for mounting photovoltaic panels, said assembly comprising:
   at least one front post having an outer anchor portion configured to be driven sufficiently into a ground mass to resist removal therefrom during wind loading of about at least twenty-one (21) pounds per square foot on said photovoltaic panels and an inner leg portion telescopically cooperating with said outer anchor portion;
   at least one rear post having an outer anchor portion configured to be driven sufficiently into a ground mass to resist removal therefrom during wind loading of about at least twenty-one (21) pounds per square foot on said photovoltaic panels and an inner leg portion telescopically cooperating with said outer anchor portion;
   at least one horizontal support member affixable to said at least one front post leg portion and said at least one rear post leg portion, said at least one horizontal support member having means for mounting the photovoltaic panels thereto.

21. A support assembly as in claim 20, wherein said at least one front post anchor portion is tubular.

22. A support assembly as in claim 20, wherein said at least one rear post anchor portion is tubular.

23. A support assembly as in claim 20, wherein said at least one front post is substantially vertical.

24. A support assembly as in claim 20, wherein said at least one rear post is substantially vertical.

25. A support assembly as in claim 20, further comprising a plurality of fasteners, wherein said at least one front post anchor portion and said at least one rear post anchor portion are provided with an aperture for receiving said fasteners and said at least one front post leg portion and said at least one rear post leg portion are provided with a plurality of apertures axially spaced apart a distance H for receiving said fasteners so that the height of said at least one front post and the height of said at least one rear post may be varied.

26. A support assembly as in claim 25, wherein said at least one front post and said at least one rear post are arranged in pairs vertically spaced apart from each other a distance W and said distances H and W are selected so that the arc tangent H/W is less than 5°.

27. A support assembly as in claim 20, further comprising at least one diagonal brace having a first end affixed to said at least one post and a second end affixed to said at least one rear post.

28. A support assembly as in claim 20, further adapted to be connected to electrical wiring, wherein said at least one horizontal support member further defines a raceway sufficient to receive said electrical wiring.

29. A support assembly as in claim 28, wherein said raceway defined by said at least one horizontal support member is C-shaped.

30. A support assembly as in claim 20, wherein said at least one front post and said at least one rear post have the characteristic of acting as electrical ground rods.

31. A support assembly as in claim 20, wherein said at least one front post anchor portion further comprises a plurality of barbs which extend in a direction opposite to the direction in which said at least one front post anchor portion is driven, whereby to resist the removal thereof from said ground mass.

32. A support assembly as in claim 20, wherein said at least one rear post anchor portion further comprises a plurality of barbs which extent in a direction opposite to the direction in which said at least one rear post anchor portion is driven whereby to resist the removal thereof from said ground mass.

33. A support assembly as in claim 20 further comprising windbreaking means affixable between said at least one front post and said at least one rear post whereby to shed wind from said support assembly.

34. A support assembly as in claim 20 further comprising windbreaking means affixable between said at least one front post and said at least one rear post whereby to shed wind from said support assembly.

35. A support assembly for mounting photovoltaic panels adapted to be connected to electrical wiring, said assembly comprising:
   at least one front post having an outer anchor portion configured to be driven sufficiently into a ground mass to resist removal therefrom during wind loading to about at least twenty-one (21) pounds per square foot on said photovoltaic panels and an inner leg portion telescopically cooperating with said outer anchor portion;
   at least one rear post having an outer anchor portion configured to be driven sufficiently into a ground mass to resist removal therefrom during wind loading of about at least twenty-one (21) pounds per square foot on said photovoltaic panels and an inner leg portion telescopically cooperating with said outer anchor portion;
   at least one horizontal support member affixable to said at least one front post leg portion and said at least one rear post leg portion, said at least one horizontal support member having means for mounting the photovoltaic panels thereto and further defining a raceway sufficient to receive said electrical wiring.

36. A support assembly as in claim 35, wherein said at least one front post anchor portion is tubular.

37. A support assembly as in claim 35, wherein said at least one rear post anchor portion is tubular.

38. A support assembly as in claim 35, wherein said at least one front post is substantially vertical.

39. A support assembly as in claim 35, wherein said at least one rear post is substantially vertical.

40. A support assembly as in claim 35 further comprising a plurality of fasteners, wherein said at least one front post anchor portion and said at least one rear post anchor portion are provided with an aperture for receiving said fasteners and said at least one front post leg portion and said at least one rear post leg portion are provided with a plurality of apertures axially spaced apart a distance H for receiving said fasteners so that the height of said at least one front post and the height of said at least one rear post may be varied.

41. A support assembly as in claim 40, wherein said at least one front post and said at least one rear post are arranged in pairs vertically spaced apart from each other a distance W and said distance H and W are selected so that the arc tangent H/W is less then 5°.

42. A support assembly as in claim 35, further comprising at least one diagonal brace, said at least one diagonal brace having a first end affixed to said at least one front post and a second end affixed to said at least one rear post.

43. A support assembly as in claim 35, wherein said raceway defined by said at least one horizontal support member is C-shaped.

44. A support assembly as in claim 35, wherein said at least one front post and said at least one rear post have the characteristic of acting as electrical ground rods.

45. A support assembly as in claim 35, wherein said at least one front post anchor portion further comprises a plurality of barbs which extend in a direction opposite to the direction in which said at least one front post anchor portion is driven whereby to resist the removal thereof from said ground mass.

46. A support assembly as in claim 36, wherein said at least one rear post anchor portion further comprises a plurality of barbs which extend in a direction opposite to the direction in which said at least one rear post anchor post is drive whereby to resist the removal thereof from said ground mass.

47. A support assembly for mounting an array of photovoltaic panels adapted to be connected to electrical wiring, said assembly comprising:
 a plurality of front posts, each of said front posts having an outer anchor portion configured to be driven sufficiently into a ground mass to resist removal therefrom during wind loading on said array of photovoltaic panels, and an inner leg portion telescopically cooperating with said outer anchor portion;
 a plurality of rear posts, each of said rear posts having an outer anchor portion configured to be driven sufficiently into a ground mass to resist removal therefrom during wind loading on said array of photovoltaic panels and an inner leg portion telescopically cooperating with said outer anchor portion;
 a front horizontal support affixable to each of said front post leg portions; and
 a rear horizontal support affixable to each of said rear post leg portions, at least one of said front or rear horizontal supports having means for mounting the photovoltaic panels thereof, and further defining a C-shaped raceway sufficient to receive said electrical wiring.

48. A support assembly for mounting photovoltaic panels adapted to be connected to electrical wiring, said assembly comprising:
 at least one front post having an outer anchor portion configured to be driven sufficiently into a ground mass to resist removal therefrom during wind loading on said photovoltaic panels and an inner leg portion telescopically cooperating with said outer anchor portion;
 at least one rear post having an outer anchor portion configured to be driven sufficiently into a ground mass to resist removal therefrom during wind loading on said photovoltaic panels and an inner leg portion telescopically cooperating with said outer anchor portion;
 at least one horizontal support member affixable to said at least one front post leg portion and said at least one rear post leg portion, said at least one horizontal support member having means for mounting the photovoltaic panels thereto and further defining a C-shaped raceway sufficient to receive said electrical wiring.

* * * * *